Sept. 15, 1931. F. V. BURMAN 1,822,920
HARROW-ROTARY KNIFE TYPE
Filed Nov. 28, 1928 3 Sheets-Sheet 1
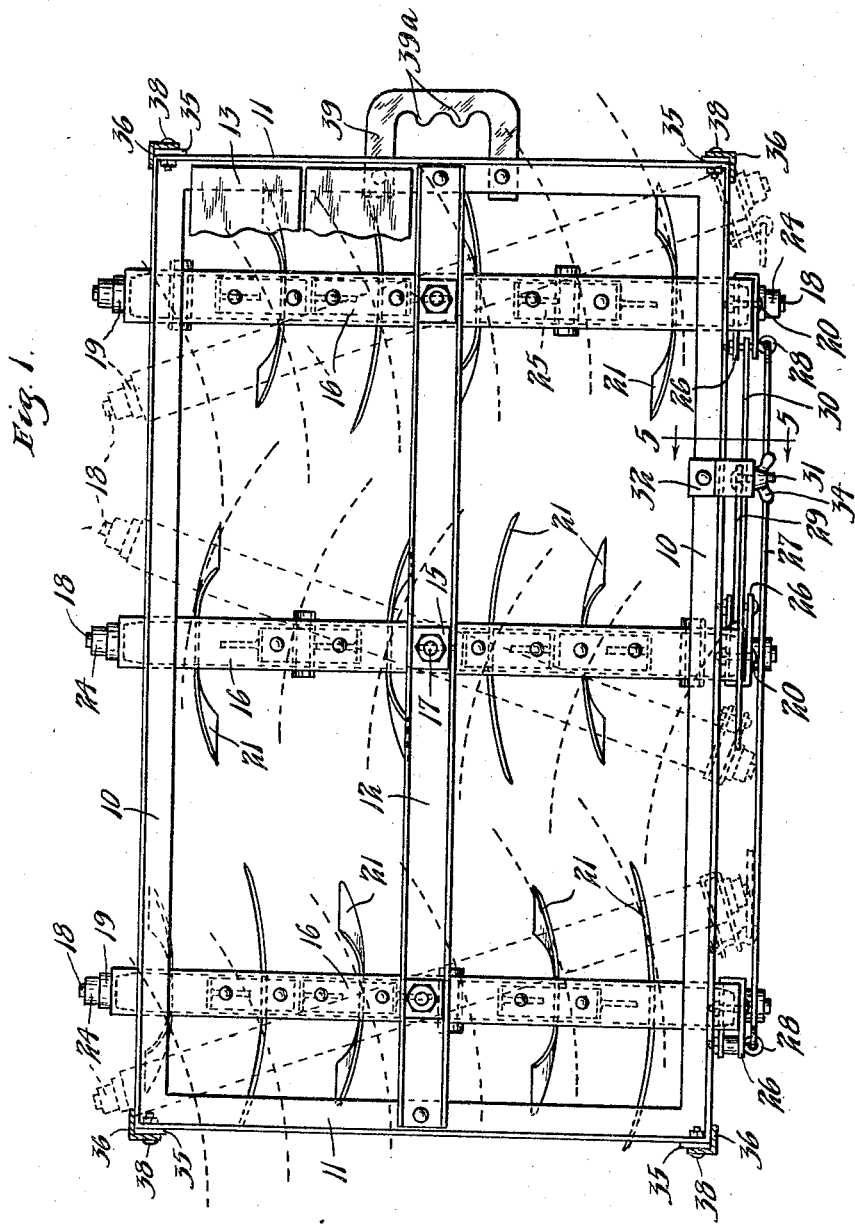
INVENTOR.
FRANK V. BURMAN.
BY HIS ATTORNEYS.

Sept. 15, 1931.  F. V. BURMAN  1,822,920
HARROW-ROTARY KNIFE TYPE
Filed Nov. 28, 1928   3 Sheets-Sheet 2
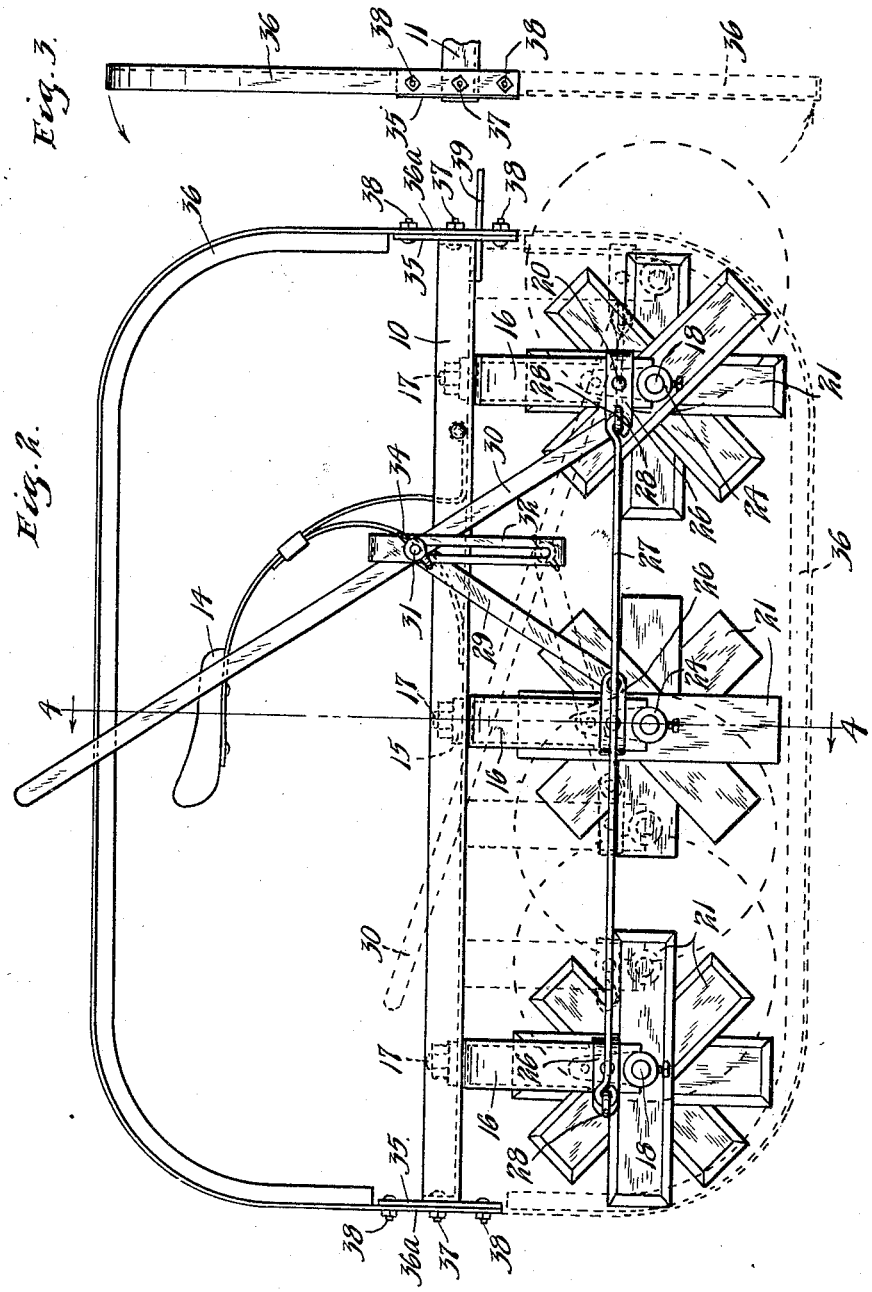
INVENTOR.
FRANK V. BURMAN.
BY HIS ATTORNEYS Sept. 15, 1931.  F. V. BURMAN  1,822,920
HARROW-ROTARY KNIFE TYPE
Filed Nov. 28, 1928  3 Sheets-Sheet 3
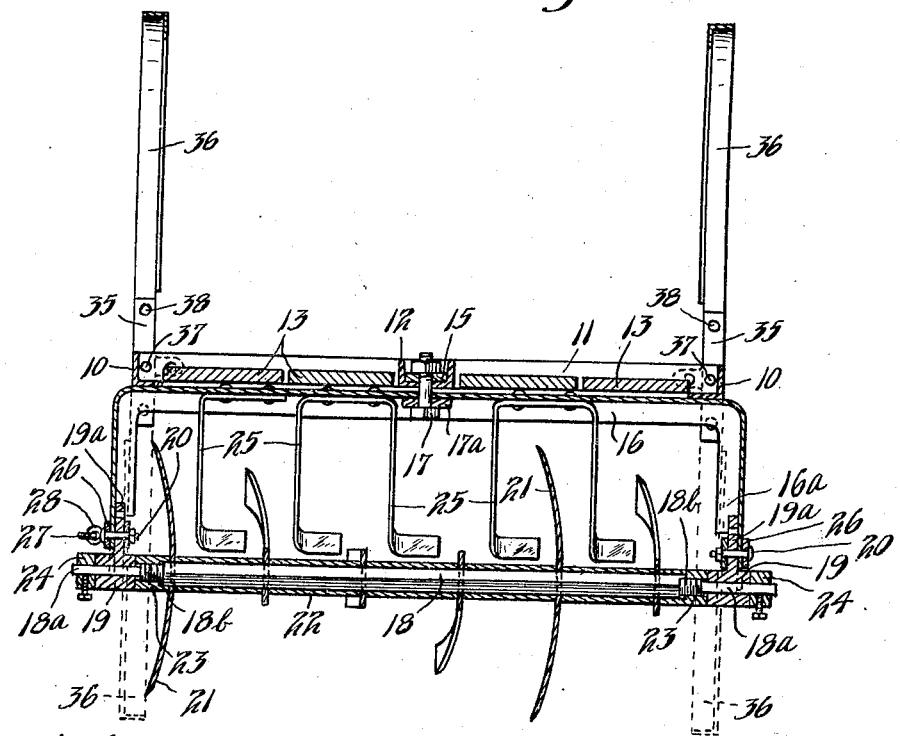
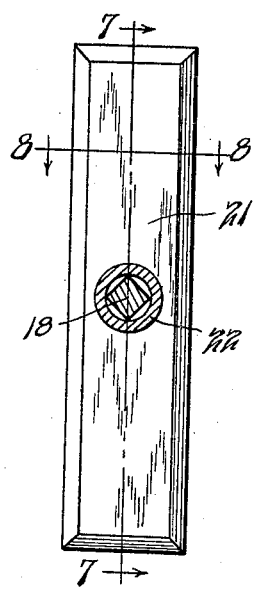
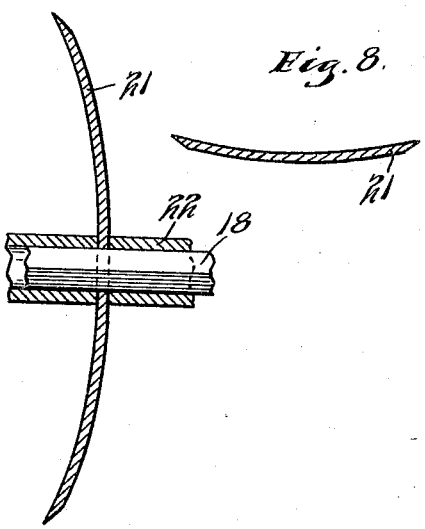
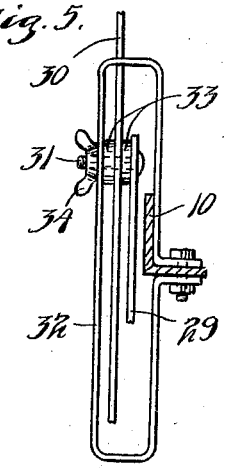
INVENTOR.
FRANK V. BURMAN.
BY HIS ATTORNEYS.

Patented Sept. 15, 1931

1,822,920

UNITED STATES PATENT OFFICE

FRANK V. BURMAN, OF MINNEAPOLIS, MINNESOTA

HARROW—ROTARY KNIFE TYPE

Application filed November 28, 1928. Serial No. 322,367.

This invention relates to agricultural implements, such as harrows or cultivators and while the various features of the invention can be used on cultivators and other analogous implements, in the embodiment of the invention illustrated, the same is shown applied to a harrow of the rotary element type.

It is an object of my invention to provide a novel and highly efficient implement for working the soil, such as a harrow or cultivator having a plurality of novel, rotary elements so arranged in a gang or gangs as to have a high utility for disintegrating the soil and the clods and for cultivating.

It is a further object to provide a device of the class above described wherein a plurality of novel, rotary knives are employed, arranged in gangs and disposed successively in different radial positions upon the shaft of the gang to effectively work the soil.

Another object is to provide an implement of the class above described having two or more gangs of rotary elements disposed one behind the other, each gang being mounted for swinging movement on a vertical axis to vary the angulation thereof with the line of travel of the device and further to provide the device with means for swinging alternate gangs in opposite directions, whereby the elements of the gangs will be angularly positioned in opposite directions and will moreover have their adjacent edges assume an overlapping or staggered relation to more effectively break up and disintegrate the soil.

Still a further object of the invention is to provide a simple and efficient harrow of the type described having runners which may be quickly swung and secured below the frame and below the rotary elements for supporting the implement with the harrow elements spaced from the ground.

These and other objects and advantages of the invention will be apparent from the following description made in connection with the accompanying drawings in which like reference characters refer to similar parts throughout the several views, and in which, Fig. 1 is a plan view of a harrow embodying my invention;

Fig. 2 is a side elevation of the same, showing the means for swinging the several gangs of elements;

Fig. 3 is a fragmentary front elevation of one of the supporting runners secured in upstanding position, the dotted lines showing the position thereof for supporting the device;

Fig. 4 is a cross section taken on the line 4—4 of Fig. 2;

Fig. 5 is a fragmentary view showing the construction and mounting of the toggle links for controlling the swinging of the several gangs;

Fig. 6 is a cross section taken through one of the element carrying shafts of a gang showing one of the harrow elements and knives in plan;

Fig. 7 is a section taken on the line 7—7 of Fig. 6; and

Fig. 8 is a section taken on the line 8—8 of Fig. 6.

As illustrated in the drawings, my harrow comprises a rectangular frame of angle bar construction having the parallel longitudinal sides 10 and the ends 11. A heavy channel member 12 extends longitudinally and centrally of the frame having its ends secured to the frame ends 11. A platform of loose planks 13 may be supported on my rectangular frame, as shown, extending longitudinally thereof and traversing the frame ends 11, and if desired a suitable spring rider's seat 14 may be supported from the central channel member 12.

As illustrated, a filler plate 15 is disposed within the channel member 12 and a plurality of (as shown 3) inverted U-shaped hanger brackets 16 are pivotally connected at spaced points beneath the heavy channel bar 12 by means of vertical bolts 17 extending through washers 17a, through the hanger brackets 16, through channel 12 and filler plate 15. As illustrated, each of the hanger brackets 16 is constructed of channel iron having the intermediate horizontal portion slightly longer than the width of my frame and having short depending arms 16a. Hanger brackets 16 are spaced equidistant apart, as clearly shown in Fig. 1. Each of the hanger brackets 16 supports a gang of harrow knives of novel construction. A knife carrying shaft 18 is provided for each gang having an elongated body portion of square cross section and cylindrical extremities 18a which are journaled in suitable bearings 19 having upstanding attachment tongues 19a. Attachment tongues 19a are disposed within the channeled extremities of the depending hanger arms 16a and are secured thereto in any suitable manner as by nutted bolts 20. As shown, attachment tongues 19a are provided with two or more spaced holes therethrough for the passage of said bolts to permit vertical adjustment of shaft 18 relative to the frame of my device.

A plurality of harrow knives of an efficient construction are non-rotatably connected to the squared body of shaft 18 extending diametrically thereof. As illustrated in Figs. 6, 7 and 8, each of said harrow knives comprises a substantially oblong plate 21 of concavo-convex structure and curved both longitudinally and laterally and having sharp beveled longitudinal and lateral edges on its convex surface. Square holes are formed through the centers of plates 21 and as shown are so arranged that half of the elements will have their longitudinal center lines diagonally intersecting the square holes, while half of the plates will have their longitudinal center lines intersecting the square holes and parallel with two sides of said holes. The knives 21 are slipped upon the square body of shaft 18 and are consecutively staggered thereon at angles of 45° being spaced apart by a series of suitable spacing sleeves 22 which have an inside diameter equal to a circumscribed circle of the square cross section of shaft 18. As shown, six knives are affixed to each of the shafts 18 and are retained thereon by means of spacing nuts 23 interposed between the inner ends of bearings 19 and the adjacent knives and having internal threaded engagement with diminished screw portions 18b formed on shafts 18 adjacent the cylindrical extremities of said shafts. Set collars 24 are secured to the cylindrical extremities 18a of the shafts at the outer sides of bearings 19. It will be noticed that the convex surfaces of the knives on one gang face the right side of the frame, while the convex surfaces on the next consecutive gang face the left side of the frame. The knives of each gang are preferably progressively longer from one end of shaft 18 to the opposite end thereof. The end of one gang having the longest knife thereon opposes the end of the adjacent gang having the shortest knife thereon. The progressive decrease in length of the knives on a gang greatly assist in clearing the gang of dirt and rubbish, moving the material toward the end of the shafts having the shorter blades thereon.

A plurality of depending scraping or cleaning members 25 are supported from the under side of the channeled hanger brackets 16, being secured within the channeled body portion and terminating in horizontal extremities which may be twisted from the depending shanks, and which are interposed between a pair of the harrow knives 21.

I provide simple mechanism for swinging the forward and rearward gangs together in one direction and simultaneously swinging the central gang in the opposite direction. As illustrated, heavy clips 26 are provided on the depending arms of the hanger brackets and may be secured about said depending arms and the attachment tongues 19a of the shaft bearings by the nutted bolts 20 previously mentioned. Clips for the forward and rearward gangs may have their open ends disposed rearwardly of the device, while the clips for the central gang has its open ends disposed forwardly. On one side of my device the forward and rearward gangs are connected together for swinging in unison by means of a suitable connection rod 27 having hooked ends engaging suitable outwardly projecting eyes 28 rigidly secured to the appropriate clips 26 on said right side of the device. Toggle operating mechanism is provided, as shown, on the right side of the frame for swinging the several gangs in unison, the forward and rearward gangs being swung in a direction opposite to the intermediate or central gang. As illustrated, I provide a pair of toggle links 29 and 30 pivoted together by a pin or bolt 31. Link 30 is elongated and projects upwardly considerably beyond its pivotal connection with the link 29 constituting a lever for actuating the mechanism. The lower end of toggle link 29 is pivotally connected between the open ends of the right hand clip 26 of the central gang and the lower end of toggle link 30 is pivotally connected between the open ends of the clip 26 of the forward gang. A vertical guide for toggle pin 31 in the form of an elongated looped strap 32 is shown affixed to the right hand side of the frame having a vertical slot 32a accommodating the pivot pin 31. Spaced washers 33 may be interposed between the inner surface of strap 32 and link 30 and between link 30 and link 29. A wing nut 34 may threadedly engage the outwardly projecting end of pin 31 on the outer side of guide strap 32 to clamp the common pivot of the toggle links at a desired position. Strap 32 is rigidly secured to the right hand longitudinal side 10 of the frame, the upper end of slot 32a limiting the upward movement of the pivot pin 31 and as shown, the gangs being disposed in parallel relation at right angles to the longitudinal sides of the frame when in said position and the lower end of slot 32a limiting the downward movement of pivot 31.

At the ends of the longitudinal sides 10 of the frame short vertical attachment plates 35 are rigidly secured and between the plates of each side member 10 of the frame a runner 36 is secured. Runners 36, as illustrated, are constructed of angle iron having the central horizontal portion and the turned ends which are connected to plates 35. Said ends 36a are pivoted to plates 35 by means of bolts 37 and are also provided with a pair of vertically spaced apertures equi-distant from the pivot 37 through which apertures retaining bolts 38 may pass to rigidly secure runners 36 to the frame in either upstanding or depending position. As illustrated in full lines in the drawings, the runners are shown in upstanding inoperative position forming railings at the longitudinal sides of the frame. It will be obvious that by removing the nuts on bolts 38 the runners may be swung downwardly to the position shown in dotted lines, the horizontal portions then being spaced slightly below the harrow knives to support the device upon the ground in order that the device may be inoperatively drawn from place to place. An eye or draft connection 39 is secured to the forward end of the frame adjacent the heavy central channel bar 12 and may be provided with a plurality of notches 39a by which different draft connections may be made if desired.

Operation

The operation of my device may be briefly described as follows:—

Runners 36 must, of course, be secured in upstanding position, as illustrated in the drawings, before the implement may be operated. If desired, weights, such as heavy stones may be placed upon the platform 13 to increase the pressure of the gangs against the ground. The forward movement of the frame will, of course, cause engagement of the consecutively staggered knives of each gang with the soil causing rotation of said knives and efficiently digging and disintegrating the soil and clods existing therein. Since the elements of the central gang are curved in the opposite direction from the elements of the front and rear gangs more thorough disintegration will be caused. The effectiveness of the device for more finely disintegrating the soil will be increased by operating the toggle mechanism to swing the several gangs. The dotted lines in Figs. 1 and 2 show the extreme angular positions which said gangs may assume. It will be seen that when the gangs are swung, the central gang is moved in a direction opposite to the front and rear gangs, causing a substantially overlapping relation of some of the elements of the central gang with some of the elements of the front and rear gangs.

It will also be noted that the elements of the central gang are longitudinally staggered in relation to the elements of the front and rear gangs. When the gangs have been swung to a desired position the same may be held therein by tightening the wing nut 31 against the guide strap 32.

The scrapers 25 prevent the accumulation of soil and rubbish between the elements of the gangs.

The oblong shape of my harrow knives having the longitudinal and lateral sharpened edges and the consecutively staggered arrangement of said elements on the carrying shafts have demonstrated, after extensive usage, a very high efficiency for disintegrating and cultivating the soil.

When it is desired to move the implement from one place to another without operating the elements, bolts 38 for the runners are removed, the runners swung down to the position shown in dotted lines in Figs. 2, 3 and 4, and bolts replaced, rigidly securing the supporting runners in position to support the frame.

From the foregoing description it will be seen that I have provided a simple, compact, implement which may be embodied in a harrow or cultivator adapted to withstand hard usage and adapted to function in a highly efficient manner.

It will, of course, be understood that various changes may be made in the form, details, arrangement and proportions of the parts without departing from the scope of applicant's invention.

What is claimed is:

1. In an implement of the class described, a frame having substantially parallel longitudinal sides, a plurality of harrow elements connected with said frame and positioned therebeneath, said harrow elements being adapted to engage the ground when in operation, runners at the longitudinal sides of said frame pivoted to said frame on substantially horizontal axes and means for securing said runners in vertical position below said frame and below said harrow elements to support said frame and means to rigidly secure said runners in vertical position above said harrow elements.

2. In an implement of the class described, a frame having substantially parallel longitudinal sides, a plurality of harrow elements connected with said frame and positioned therebeneath, a platform supported on said frame and covering said harrow elements, a runner pivoted to each of the longitudinal sides of said frame on a substantially horizontal axis, means for securing said runners in vertical position below said frame and said harrow elements to support said frame and provide side guards for said harrow elements and means for securing said runners in upright position above said harrow elements to constitute railings for said platform.

3. In an implement of the class described, a frame, at least two gangs of soil-working elements mounted one behind the other transversely of said frame, said gangs being mounted for varying their angular relation to the longitudinal center line of said frame and a toggle mechanism for moving said gangs simultaneously in opposite directions comprising a pair of links pivoted together at their upper portions and each having its lower end connected with one of said gangs and a substantially vertical guiding member in which the common pivot for said links is confined.

4. In an implement of the class described, a frame, at least two gangs of soil-working elements mounted one behind the other transversely of said frame, said gangs being mounted for varying their angular relation to the longitudinal center line of said frame and a toggle mechanism for moving said gangs simultaneously in opposite directions comprising a pair of links having their upper ends crossed and connected together by a common pivot member, one of said links projecting upwardly beyond the other and terminating in a handle, each of said links having its lower end connected to one of said gangs and a substantially vertical guiding member fixed to said frame and having means for confining said common pivot for vertical movement.

5. In an implement of the class described, a frame having a horizontal central member extending longitudinally thereof, depending hanger brackets pivoted to said central member on vertical axes and spaced apart longitudinally of said frame, element carrying shafts mounted in said hanger brackets and disposed transversely of said frame, a series of harrow elements on each of said shafts and connections between at least two of said hanger brackets for swinging one in one direction and the other in the opposite direction, a toggle connection between two of said brackets, and means for spreading or contracting said toggle connection to swing said brackets in opposite directions.

In testimony whereof I affix my sinature.

FRANK V. BURMAN.